(12) United States Patent
Persson

(10) Patent No.: US 6,652,263 B2
(45) Date of Patent: Nov. 25, 2003

(54) INGATE ARRANGEMENT FOR AN INJECTION MOLD

(75) Inventor: Lars Persson, Kristianstad (SE)

(73) Assignee: Nolato AB, Torekov (SE)

(*) Notice: Subject to any disclaimer, the term of this patent is extended or adjusted under 35 U.S.C. 154(b) by 31 days.

(21) Appl. No.: 10/036,379

(22) Filed: Jan. 7, 2002

(65) Prior Publication Data

US 2003/0068403 A1 Apr. 10, 2003

(30) Foreign Application Priority Data

Oct. 10, 2001 (SE) ............................................. 0103382

(51) Int. Cl.⁷ ............................................. B29C 45/40
(52) U.S. Cl. ........................ 425/556; 425/577; 264/334
(58) Field of Search ................................ 425/556, 577, 425/444; 264/334

(56) References Cited

U.S. PATENT DOCUMENTS

| 4,929,170 A | 5/1990 | Boskovic |
| 5,512,223 A | * 4/1996 | Morikita ..................... 425/556 |

FOREIGN PATENT DOCUMENTS

| JP | 60068913 | 4/1985 |
| JP | 6-143346 | * 5/1994 |
| JP | 7080896 | 3/1995 |
| JP | 8281708 | 10/1996 |

* cited by examiner

Primary Examiner—Tim Heitbrink
(74) Attorney, Agent, or Firm—Burns, Doane, Swecker & Mathis, L.L.P.

(57) ABSTRACT

A mold includes a first and a second mutually joinable mold half which in their joined state define at least one cavity, and a sprue formed in the mold for conducting a melt to each cavity. The sprue includes an ingate portion connecting to each cavity and contained in a first ejector of an ejector arrangement. An injection molding assembly including such a mold is also disclosed.

13 Claims, 8 Drawing Sheets

INGATE ARRANGEMENT FOR AN INJECTION MOLD

FIELD OF THE INVENTION

The present invention relates to an injection moulding assembly and a mould therefor and, more specifically, such a mould comprising two mutually joinable mould halves which in their joined state define at least one cavity, and a sprue formed in the mould for passing a melt to each cavity.

BACKGROUND ART

In injection moulding of a plastic component, a plastic melt is introduced into a cavity defined by two mould halves of a mould. More specifically, the plastic melt is passed through a channel system extended in the mould, such as a hot runner system, up to an ingate through which the melt enters the cavity.

It will be appreciated that the ingate causes a surface defect in the component. The location and design of the ingate is thus dependent on the surface requirements that are placed on the completed component.

In some cases it is desirable for the surface defect caused by the ingate to be as small as possible and located on an inside or rear side of the component. The ingate is placed on a side of the cavity that corresponds to the inside or rear side of the component. Examples of components where it is most important for such minor surface defects to appear on a side that is not exposed to the surroundings are high status products, such as casings for mobile phones.

This can be achieved, for example, by placing a suitably designed ingate directly at the end of the hot runner system and simultaneously forming the cavity in such manner that the inside of the component faces the hot runner system.

This solution, however, suffers from a number of drawbacks. For removing the completed component from the mould, ejectors are normally used, which when operated are caused to engage the component. Ejectors are normally arranged in such manner as to engage the inside of the component so as to guarantee an outside without surface defects caused by the ejectors. To render this possible in the solution described above, the ejectors must thus be arranged in the same mould half as the hot runner system. The hot runner system, which is usually arranged in a fixed first mould half, is however in most cases fairly bulky, and therefore it may be difficult to find space for the ejectors in the same mould half as said hot runner system. Moreover, it may be difficult to arrange the mechanism that drives the ejectors in the fixed mould half.

It is thus common to arrange the ejectors in a movable second mould half and, if the ejectors are to engage an inside of the component, consequently it is necessary to conduct the melt from the hot runner system, on to the second mould half and then on to the ingate which leads to the cavity on a side corresponding to the inside of the component.

A prior art method of accomplishing this is illustrated in FIGS. 1–4. According to this solution, an insert 101 is arranged in the second mould half 102. The insert 101 defines two interconnected channels 103, 104. A first 103 of the channels forms an extension of an ejector channel 105 formed in the second mould half 102. A second 104 of the channels forms a trunk-like intake and extends arcuately in and under the cavity 106 and leads to an ingate positioned on a side of the cavity 106 corresponding to the inside of the component.

In said ejector channel 105, a first ejector 110 is arranged, which thus forms a demarcation of the first channel 103.

When producing a component 107, a melt 108 is introduced through a hot runner system 109 into the two channels 103, 104, which is clearly to be seen in FIG. 2.

That part of the melt 108 which is introduced into the second channel 104 fills the cavity 106 through the ingate 111.

The injection moulded component 107 is then cooled, after which the mould halves 102, 112 are divided and the ejectors 110, 113 operated, as shown in FIG. 3.

By operation of the ejectors 110, 113 they are caused to engage the component 107 for ejection.

That part of the melt 107 which fills the two channels 103, 104 forms a sprue slug 114. When operating the ejectors 110, 113, the first ejector 110 will engage the cylindrical part 115 of the sprue slug 114 which fills the first channel 103. By ensuring that the length of the first channel 103 is greater than the length of the arcuate portion 116 of the second channel 104 it is ensured that the trunk-like part 117 of the sprue slug 114 which fills said arcuate portion 116 is released from the component 107 and extracted from the arcuate portion 116.

FIG. 4 illustrates both the component 107 and the sprue slug 114 in the ejected state.

This prior art method, however, suffers from a number of drawbacks. First, it causes a considerable amount of waste material in the form of sprue slugs 114. The insert 101 must be made of two pieces which in their joined state define said channels 103, 104. The reason for this is that it would otherwise not be possible to provide said arcuate portion 104 of the second channel 104. Finally, there is a risk of the trunk-like part 117 of the sprue slug 114 being broken off from the cylindrical part 115. In particular it will be impossible to use non-elastic plastics in injection moulding, such as thermosetting plastics or reinforced plastics.

There is thus a need for an improved method of producing components which have a minor surface defect caused by an ingate on their insides or rear sides.

SUMMARY OF THE INVENTION

In view of that stated above, an object of the present invention is to provide an improved mould for producing plastic components.

Another object is to provide such a mould for producing components which have a minor surface defect caused by an ingate on a side that is not exposed to the surroundings.

It is also an object of the invention to provide an injection moulding assembly having such a mould.

According to the present invention, the above objects and also other objects that will appear from the following description are achieved by a mould having the features stated in claim 1 and an injection moulding assembly having the features stated in claim 10. Preferred embodiments of the mould are evident from claims 2–9.

More specifically, according to the present invention a mould is provided, comprising two mutually joinable mould halves which in their joined state define at least one cavity and a sprue formed in the mould for passing a melt to each cavity, said mould being characterised in that the sprue comprises an ingate portion connecting to each cavity and formed in a first ejector of an ejector means.

This results in an improved mould which allows production of components having a minor surface defect caused by an ingate and located on an inside or rear side of each component. This is achieved thanks to the fact that the sprue that passes the melt to the cavity comprises an ingate portion contained in one of the ejectors. As a result, the need for complicated inserts in the mould is eliminated while at the same time it will be possible to injection mould components of reinforced plastics or thermosetting plastics.

According to a preferred embodiment of the inventive mould, the ejector means comprises additional ejectors, each ejector being arranged in an ejector channel formed in said second mould half. Said first ejector is advantageously adapted to perform its ejecting motion with a time delay in relation to the other ejectors. This makes it possible to accomplish release of a sprue slug from the completed component during the initial ejecting process. For instance, this can be achieved by the mould comprising press pins which are insertable into said ejector channels for engaging the ejectors. The press pin which engages said first ejector is arranged in such manner that its engagement is delayed in terms of time compared with the engagement of the other press pins with associated ejectors.

According to another preferred embodiment, the ingate portion contained in said first ejector comprises an inlet in the circumferential surface of the ejector and an ingate-forming outlet in an end face of the ejector. Said inlet is advantageously axially displaced from said end face.

The ingate portion has preferably a cross-sectional area tapering towards the ingate-forming outlet.

According to yet another embodiment, the channel also comprises a connecting portion which extends from a parting plane between the mould halves of the mould to said ingate portion.

Further according to the present invention, an injection moulding assembly is provided, comprising a mould at stated above.

A preferred embodiment of the present invention will now be described by way of example and with reference to the accompanying drawings.

DESCRIPTION OF EMBODIMENTS

The present invention relates to a mould of an injection moulding assembly. Units of said injection moulding assembly in addition to its mould, such as extruder unit, are not relevant to the invention and will therefore not be described.

Figure 1:
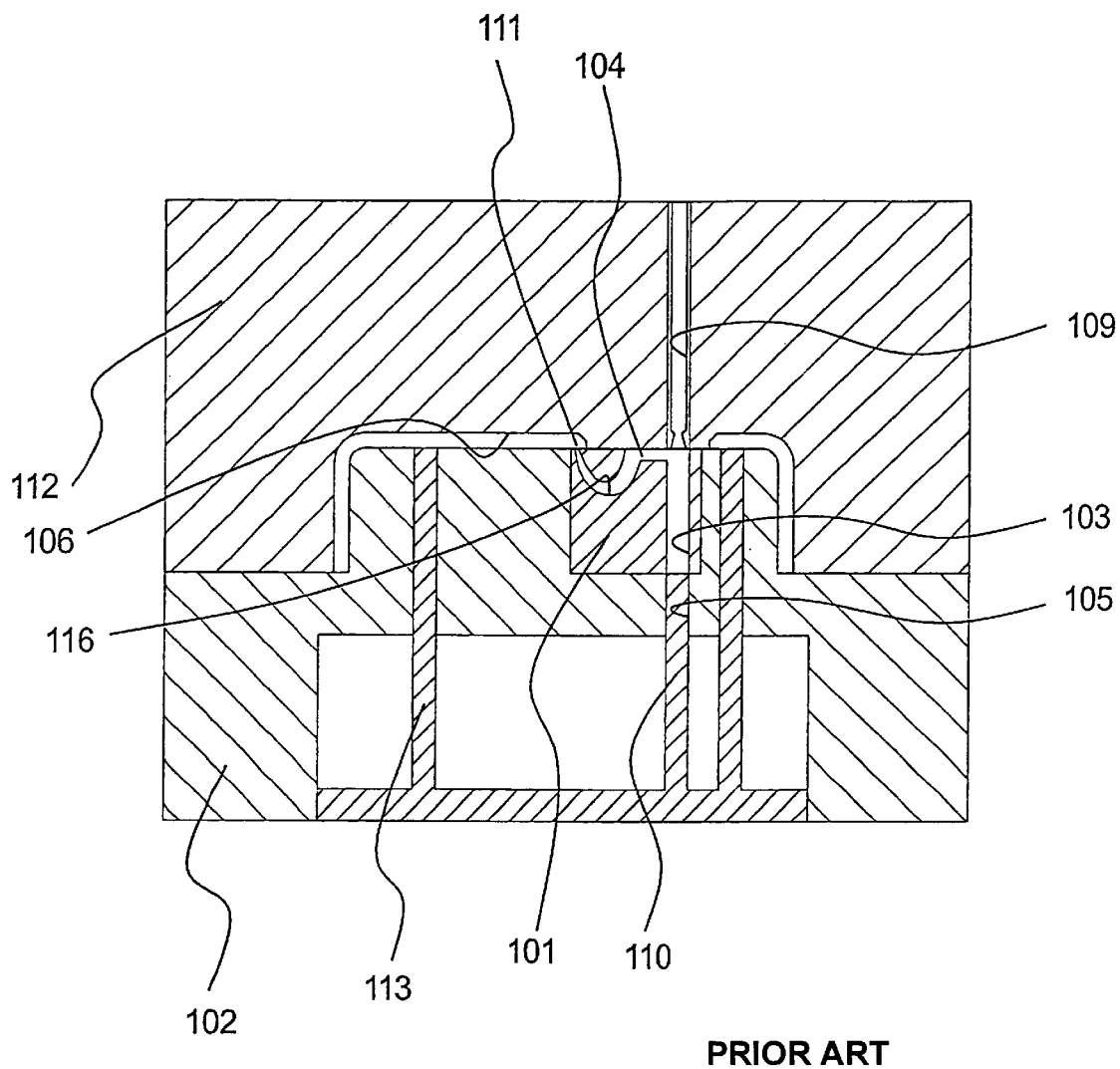
FIGS. 1–4 are schematic cross-sectional views of a conventional mould for producing a component, the various views illustrating the mould in different steps during an injection moulding process.
Figure 2:
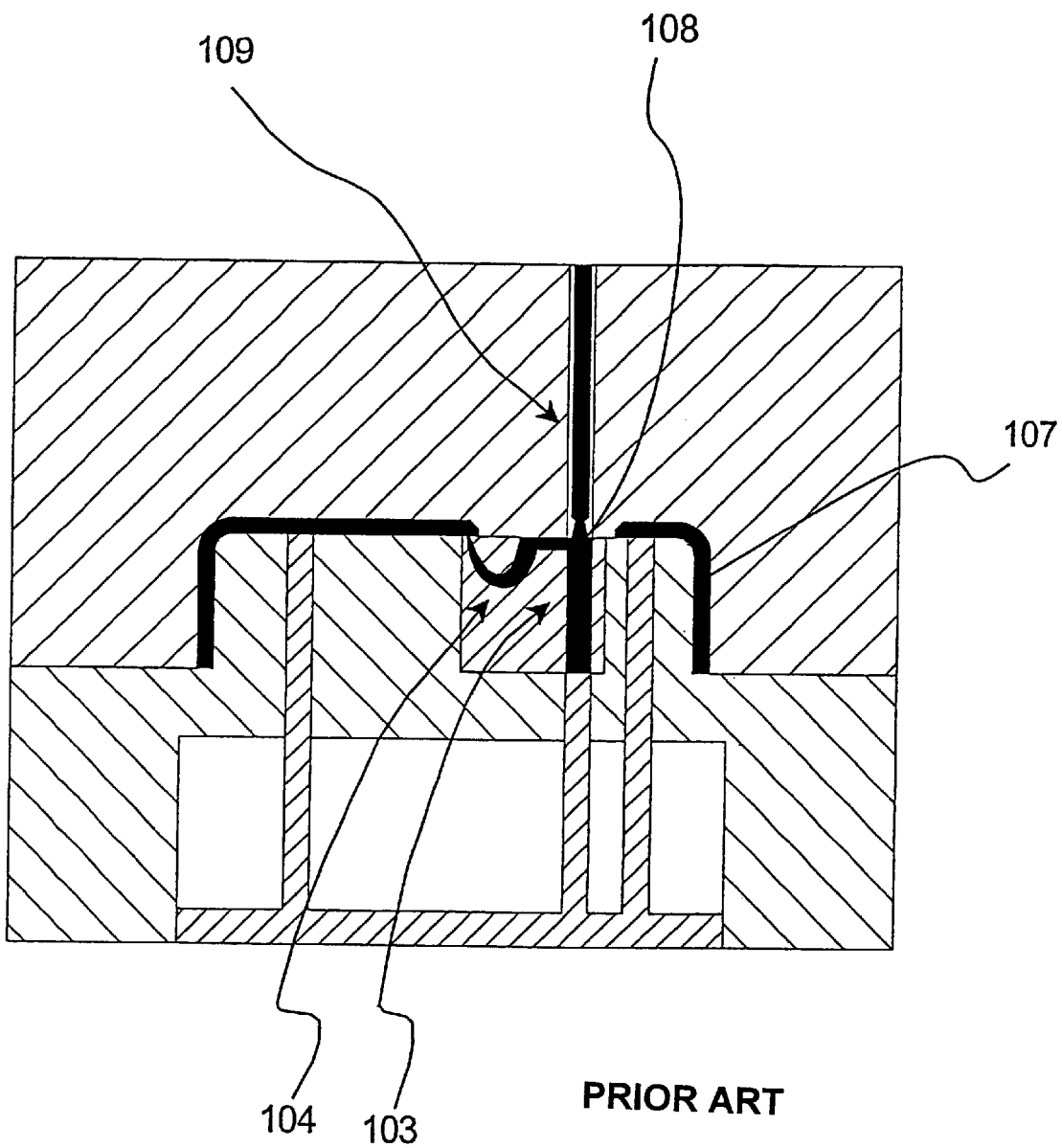
Figure 3:
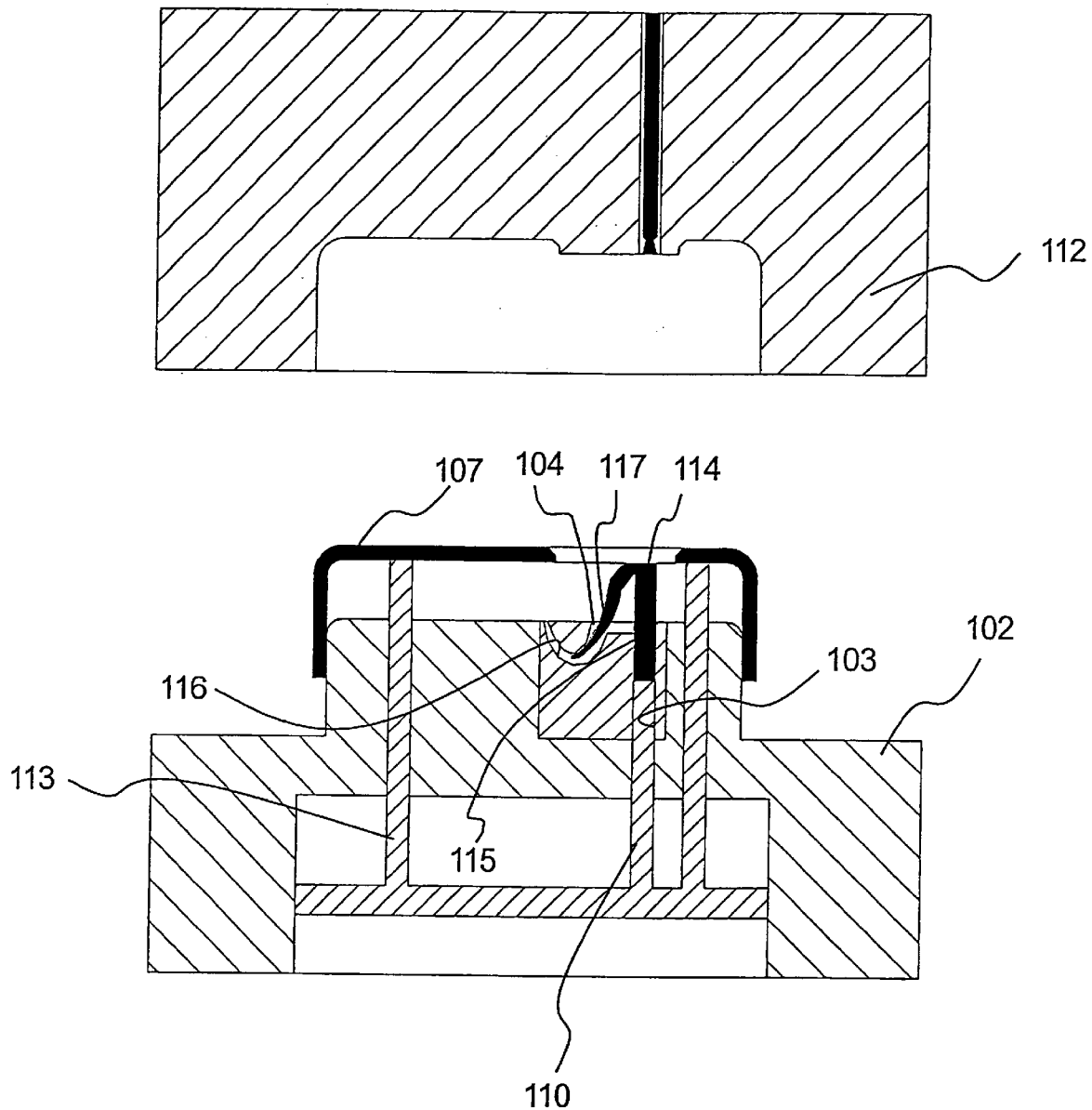
Figure 4:
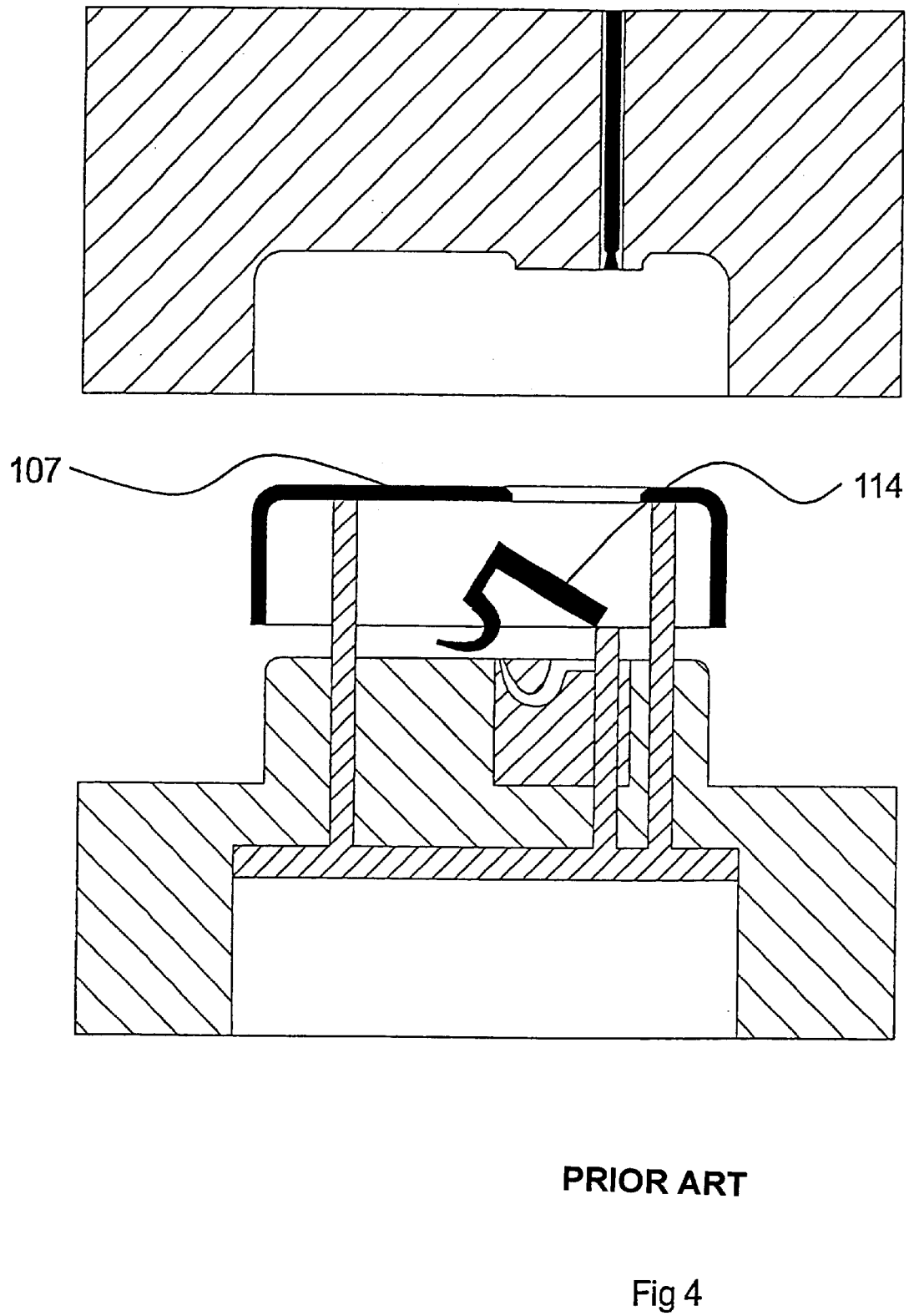
Figure 5:
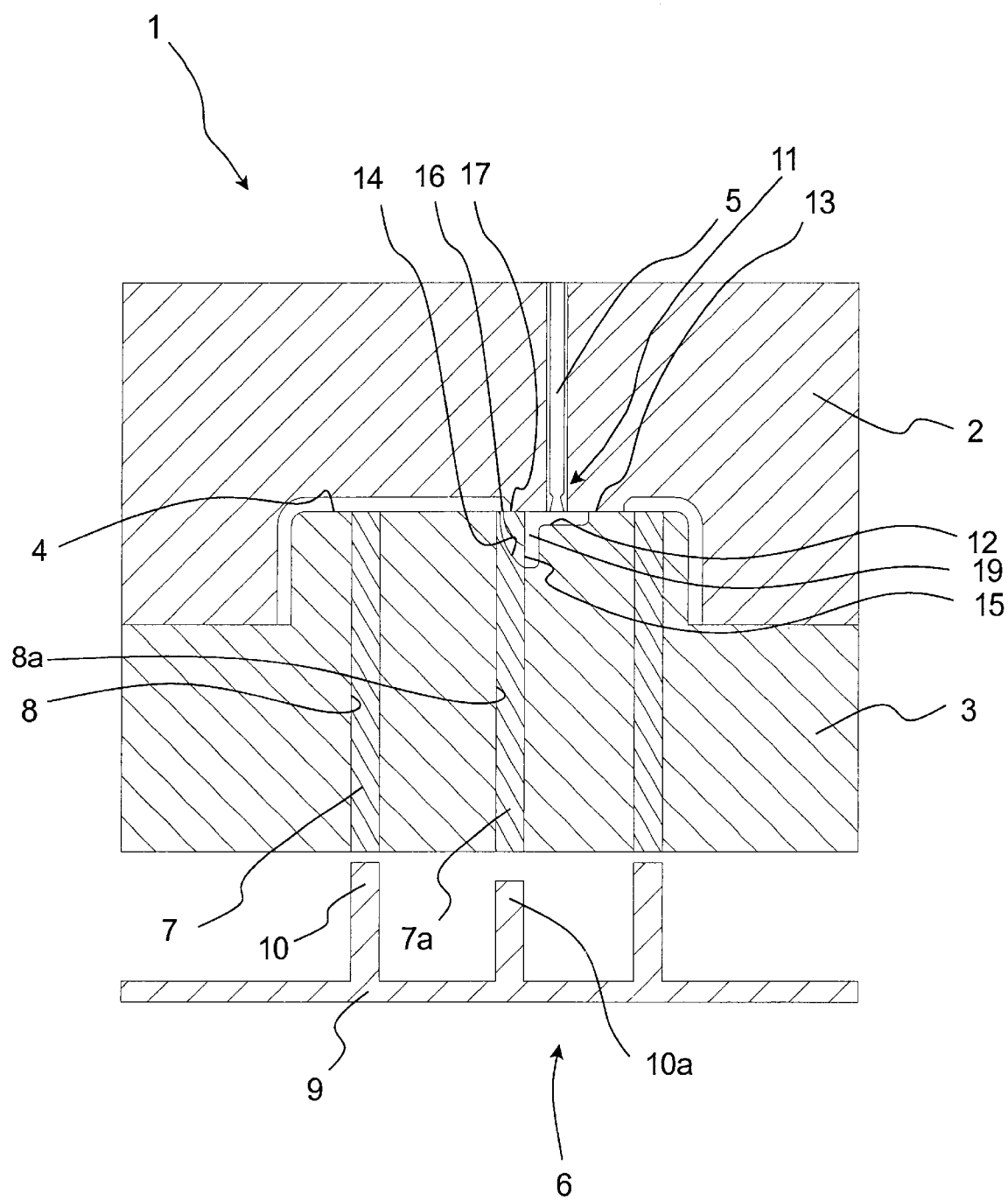
FIG. 5 is a schematic cross-sectional view of an inventive mould.

FIG. 5, to which reference is now made, illustrates an inventive mould 1 for an injection moulding assembly.

The mould 1 comprises a first 2 and a second 3 mould half which are mutually joinable to define a cavity 4.

The mould 1 further comprises an ejector means 6. The ejector means comprises a plurality of ejectors 7, which are arranged in ejector channels 8 formed in the second, normally movably arranged mould half 3, and an ejector plate 9 which supports a number of press pins 10 corresponding to the number of ejectors 7.

A sprue 11 is formed in the mould 1 for passing a melt supplied to the mould 1 to said cavity 4.

The sprue 11 comprises a channel system 5, for instance in the form of a hot runner system, which is arranged in the first, normally fixedly arranged mould half 2.

The sprue 11 further comprises a connecting portion 12 formed in a surface 13 of the second mould half 3, said surface 13 facing the first mould half 2. The sprue 11 also comprises an ingate portion 14, which communicates with the channel system 5 through said connecting portion 12.

The ingate portion 14 of the sprue is contained in a first 7a of the ejectors 7, which is arranged in a first 8a of the ejector channels 8.

The ingate portion 14 is extended between an inlet 15 in the circumferential surface of the first ejector 7a and an ingate-forming outlet 16 in one end face of the same ejector 7a and has a cross-sectional area tapering towards the outlet 16.

Advantageously the ingate portion 14 consists of a groove formed in the circumferential surface of the ejector 7a, but it will be appreciated that the ingate portion 14 can also be designed in the form of a hole formed in the ejector 7a.

The inlet 15 connects to the connecting portion 12 formed in the surface 13 of the second mould half 3, and the ingate-forming outlet 16 connects to the cavity 4 at a side corresponding to the inside or rear side of the component as completed.

The inlet 15 of the ingate portion 14 is axially displaced from the ingate-forming outlet 16, and thus the connecting portion 12 has a depression 19 in the position in which it connects to the inlet of the ingate portion 14.

Figure 6:
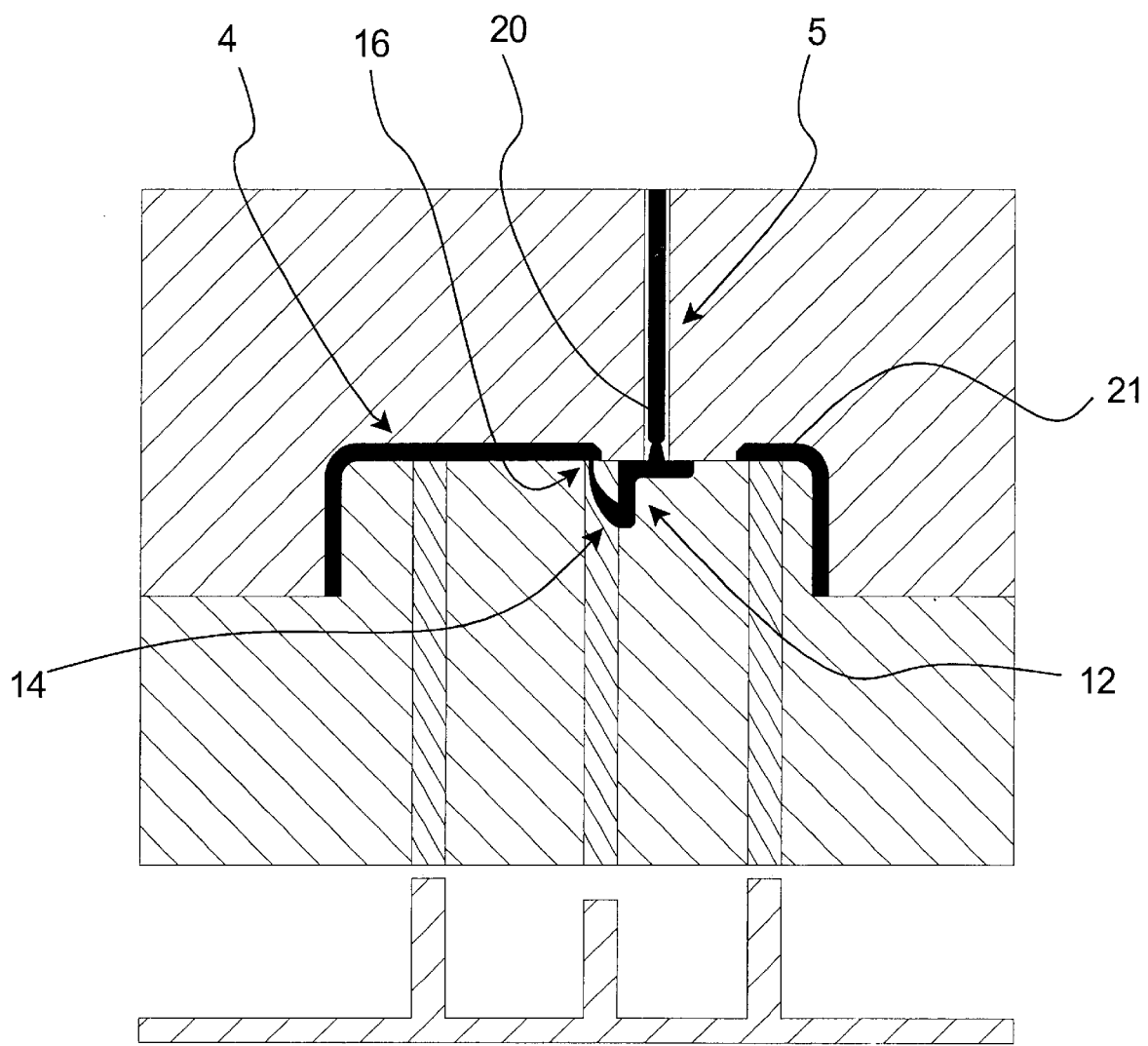
FIGS. 6–8 are schematic cross-sectional views of the mould in FIG. 5, the various views illustrating the mould in different steps during an injection moulding process.

FIG. 6, to which reference is now made, illustrates how a melt 20 is supplied from the channel system 5 on to the cavity 4. More specifically, the melt will be passed in the connecting portion 12 formed in said surface 13 and on to the ingate portion 14 connecting thereto. From there the melt 20 is passed into the cavity 4 through the ingate-forming outlet 16.

Figure 7:
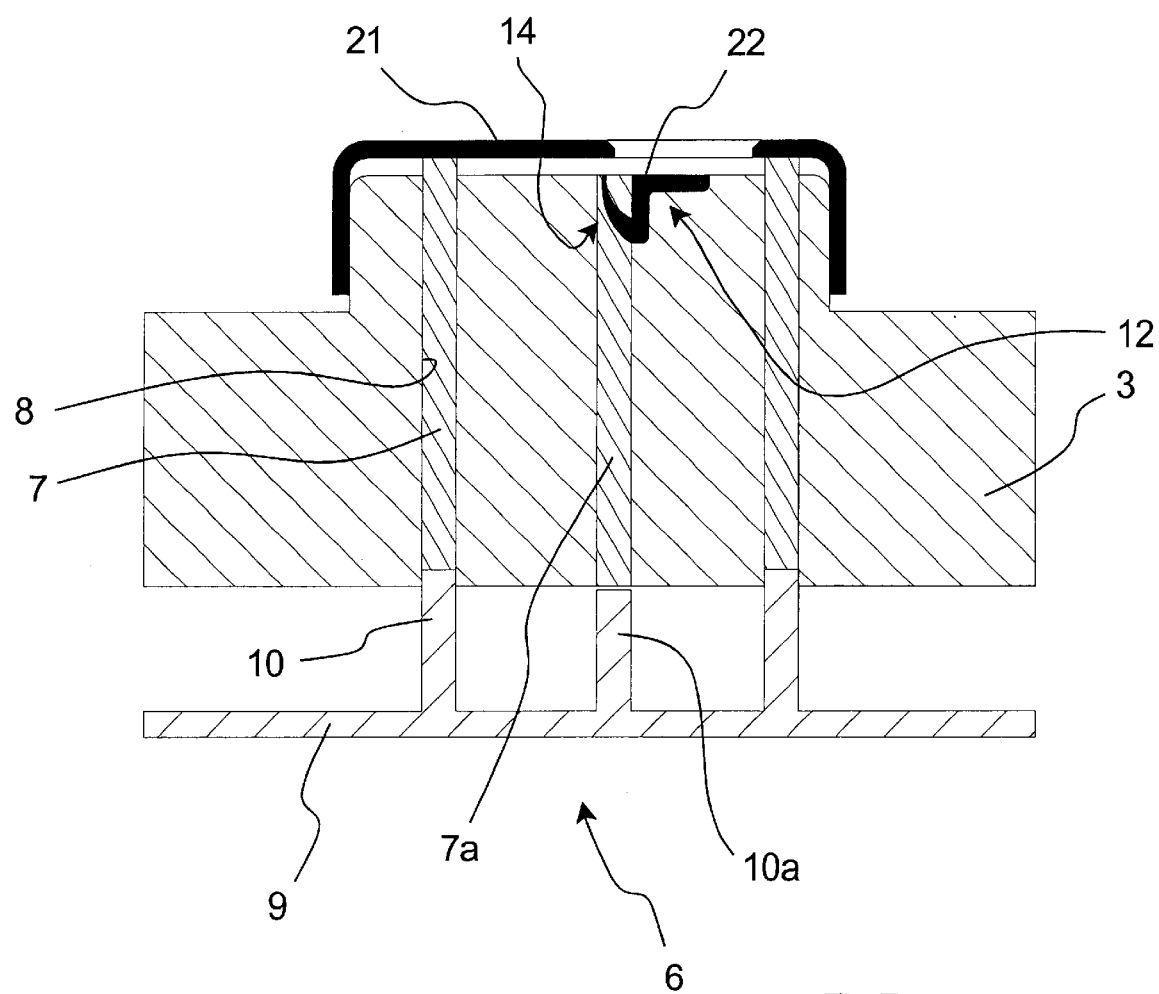

In FIG. 7, to which reference is now made, the mould halves 2, 3 have been divided and the ejector means 6 has been operated. To accomplish this, a relative motion between the ejector plate 9 and the second mould half 3 takes place, whereby the press pins 10 are inserted into the ejector channels 8 and engage the ejectors 7, which will thus be operated to eject the completed component 21.

It is to be noted that the press pin 10a which engages the first ejector 7a is shorter than the other press pins 10. This is evident from the figure, where all press pins 10, except for the press pin 10a which is arranged for engagement with said first ejector 7a, have been caused to engage the associated ejectors 7. As a result, it will be ensured that the engagement of the press pin 10a with said first ejector 7a is delayed. Owing to the fact that the first ejector 7a performs its ejecting motion with a time delay, it is ensured that a sprue slug 22 in the connecting portion 12 and the ingate portion 13 is retained while the completed component 21 is being ejected. This results in release of the sprue slug 22 from the completed component 21 during the initial ejecting process.

Figure 8:
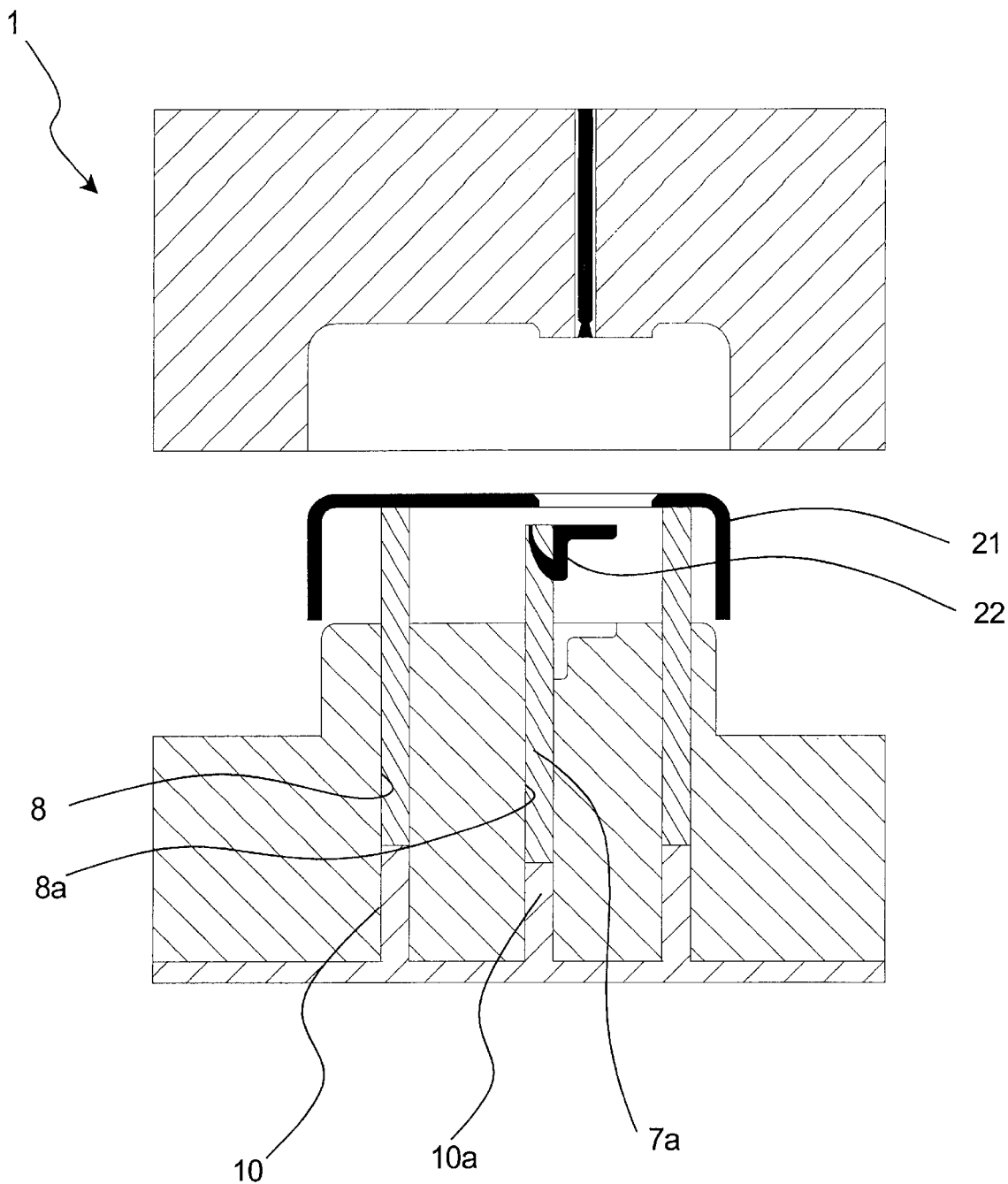

FIG. 8, to which reference is now made, illustrates the mould 1 in a state in which all press pins 10, 10a are inserted into the respective ejector channels 8, 8a. Also said first ejector 7a has been operated and, thus, has ejected the sprue slug 22.

A robot (not shown) can be arranged to remove the completed component 21 and the sprue slug 22 from the mould 1 in connection with the ejection thereof.

As a result, a mould 1 is provided, which allows production of components 21 with a surface defect caused by an ingate and positioned on an inside or rear side of the component 21. The mould 1 also allows ejection of the component 21 by means of ejectors 7 arranged in a mould half 3 opposite to the mould half 2 in which the channel system 5 is arranged. Finally, the inventive mould 1 allows the ingate to be formed to cause as small a surface defect as possible. In practice, this is advantageously achieved by designing the ingate-forming outlet 16 of the ingate portion 14 with a small cross-sectional area. Preferably, the ingate portion 14 has a cross-sectional area continuously tapering towards the ingate-forming outlet 16. This ensures a controlled pattern of flow of the melt 20 when passed into the cavity 4.

It will be appreciated that the present invention is not restricted to the embodiment shown.

For instance, it is conceivable to provide the ingate portion 14, which is formed in the first ejector 7a, in other manners.

Moreover, the first ejector 7a can be arranged for a delayed ejector motion in other fashions.

It will also be appreciated that the mould can define more than one cavity and also that the mould may comprise several pairs of mutually joinable mould halves.

Finally it will be appreciated that the mould can be arranged on an injection moulding assembly in various ways. The mould can be arranged in a conventional manner with one mould half of each pair on one section each of the assembly, which sections can be brought together to join the mould halves. However, it is also possible to arrange, for instance, the mould halves on one and the same section and provide the second section with a locking means, which by bringing together these sections is adapted to lock the mould halves in their joined state.

Several modifications and variations are thus feasible, and therefore the scope of the invention is exclusively defined by the appended claims.

What is claimed is:

1. A mould comprising:
    a first and a second mutually joinable mould half which in their joined state define at least one cavity and
    a sprue formed in the mould for passing a melt to each cavity,
    the sprue comprising an ingate portion connecting to each cavity and formed in a first ejector of an ejector arrangement, and the ejector arrangement comprising additional ejectors, each ejector being arranged in an ejector channel contained in the second mould half, and the first ejector is arranged to perform its ejecting motion with a time delay relative to the other ejectors.

2. A mould comprising:
    a first and a second mutually joinable mould half which in their joined state define at least one cavity;
    a sprue formed in the mould for passing a melt to each cavity;
    the sprue comprising an ingate portion connecting to each cavity and formed in a first ejector of an ejector arrangement, the ejector arrangement comprising additional ejectors, each ejector being arranged in an ejector channel contained in the second mould half; and
    press pins which are insertable into the ejector channels for engaging the ejectors.

3. A mould as claimed in claim 2, wherein a press pin engages the first ejector is arranged in such manner that its engagement is delayed in terms of time compared with the engagement of other press pins with associated ejectors.

4. A mould as claimed in claim 1, wherein the ingate portion contained in the first ejector comprises an inlet in the circumferential surface of the first ejector and an ingate-forming outlet in an end face of the first ejector.

5. A mould as claimed in claim 4, wherein the inlet is axially displaced from the end face.

6. A mould as claimed in claim 1, wherein the ingate portion has a cross-sectional area tapering towards an ingate-forming outlet.

7. A mould as claimed in claim 1, wherein the sprue further comprises a connecting portion which extends from a parting plane between the mould halves of the mould to the ingate portion.

8. An injection moulding assembly comprising a mould as claimed in claim 1.

9. A mould as claimed in claim 1, further comprising press pins which are insertable into the ejector channels for engaging the ejectors.

10. A mould as claimed in claim 9, wherein a press pin engages the first ejector and is arranged in such manner that its engagement is delayed in terms of time compared with the engagement of other press pins with associated ejectors.

11. A mould as claimed in claim 2, wherein the ingate portion contained in the first ejector comprises an inlet in the circumferential surface of the ejector and an ingate-forming outlet in an end face of the ejector.

12. A mould as claimed in claim 2, wherein the ingate portion has a cross-sectional area tapering towards the ingate-forming outlet.

13. A mould as claimed in claim 2, wherein the sprue further comprises a connecting portion which extends from a parting plane between the mould halves of the mould to the ingate portion.

* * * * *